United States Patent [19]

Rogler et al.

[11] Patent Number: 4,562,227

[45] Date of Patent: Dec. 31, 1985

[54] HEAT-HARDENABLE REACTION RESIN MIXTURES COMPRISING POLYFUNCTIONAL EPOXIDE, POLYISOCYANATE PREPOLYMER AND A REACTION ACCELERATOR WHICH IS EITHER A TERTIARY AMINE OR AN IMIDAZOLE

[75] Inventors: Wolfgang Rogler, Erlangen; Helmut Markert, Nuremberg; Klaus Kretzschmar, Erlangen; Gerhard Piecha, Nuremberg, all of Fed. Rep. of Germany

[73] Assignee: Siemens Aktiengesellschaft, Munich, Fed. Rep. of Germany

[21] Appl. No.: 624,982

[22] Filed: Jun. 27, 1984

[30] Foreign Application Priority Data

Jun. 27, 1983 [DE] Fed. Rep. of Germany ....... 3323123

[51] Int. Cl.$^4$ .............................................. C08G 18/38
[52] U.S. Cl. .................. 524/786; 264/328.1; 427/104; 523/457; 523/466; 524/788; 524/850; 525/452; 528/59; 528/73
[58] Field of Search ........................ 524/786, 788, 850; 523/457, 466; 525/452; 528/59, 73; 264/328.1; 427/104

[56] References Cited

U.S. PATENT DOCUMENTS

| | | | |
|---|---|---|---|
| 3,198,851 | 8/1965 | Hoy | 525/111 |
| 3,394,164 | 7/1968 | McClellan et al. | 521/159 |
| 4,055,548 | 10/1977 | Carleton et al. | 521/124 |
| 4,070,416 | 1/1978 | Narahara et al. | 528/73 |
| 4,100,118 | 7/1978 | Numata et al. | 528/73 |
| 4,220,731 | 9/1980 | Zuppinger | 525/439 |

*Primary Examiner*—Maurice J. Welsh
*Attorney, Agent, or Firm*—Kenyon & Kenyon

[57] ABSTRACT

The invention relates to heat-hardenable reaction resin mixtures which contain polyfunctional epoxides, polyfunctional isocyanates and a reaction accelerator as well as, optionally containing customary additives and/or fillers. The invention has the object of achieving reaction resin mixtures which are stable in storage, consist of individual components that are easy to mix, exhibit a prolonged prehardening period and permit at the same time the manufacture of materials which combine the good mechanical properties and the high temperature-cycle resistance of polyurethane structures with the good thermal properties of oxazolidinone and isocyanurate structures. According to the invention, the reaction resin mixtures contain as polyfunctional isocyanates, isocyanate prepolymerisates in the form of reaction products of diphenyl methanediisocyanate and a diol, or of an isocyanate mixture of diphenyl-methanediisocyanate and a polymethylenepolyphenylisocyanate (with a functionality greater than 2) and a diol. The prepolymerisates utilize 0.01 to 0.35 equivalents and preferably 0.05 to 0.2 equivalents of the diol per 1 equivalent of isocyanate; the mixture contains 0.2 to 5 equivalents isocyanate per 1 equivalent of epoxy. The reaction accelerator is a tertiary amine or an imidazole.

15 Claims, 1 Drawing Figure

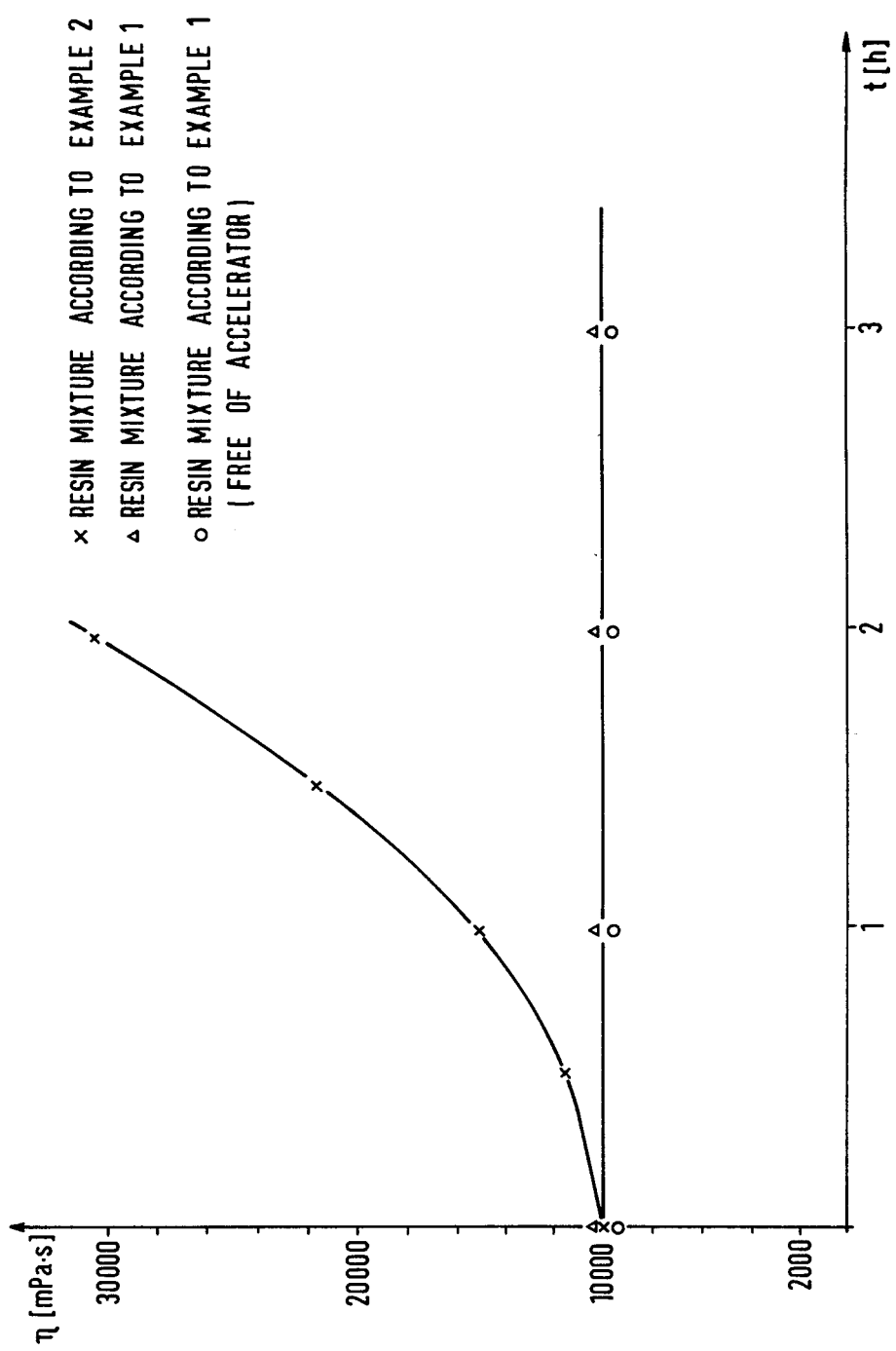

HEAT-HARDENABLE REACTION RESIN MIXTURES COMPRISING POLYFUNCTIONAL EPOXIDE, POLYISOCYANATE PREPOLYMER AND A REACTION ACCELERATOR WHICH IS EITHER A TERTIARY AMINE OR AN IMIDAZOLE

The invention relates to heat-hardenable reaction resin mixtures which contain polyfunctional epoxides, polyfunctional isocyanates and a reaction accelerator as well as optionally containing customary additives and/or fillers. The invention as well relates to the use of such reaction resin mixtures.

For the manufacture of high-quality molded materials for electrotechnology, acid anhydride-hardenable epoxy resins are used predominantly as impregnating and casting resins. The customary processing methods for epoxy resins such as vacuum casting, VPI (vaccum-pressure technique) and processing analogous to injection molding require resins with a use life sufficient for the technique. The minimum use time of the epoxy resins is determined by various parameters such as processing, casting time and casting volume it can be as much as several days. Through the development of so-called latent reaction accelerators, it has been possible to make use of epoxy resins which will not harden until special processing parameters are achieved.

In addition to more stringent requirements regarding the processing properties of epoxy resins, the requirements for thermal and mechanical load-carrying capacity of the molded materials made therefrom are more stringent. This, however, requires especially improved temperature cycle resistance with, at the same time, high dimensional heat resistance.

In acid anhydride-hardened epoxy resin molded materials, however, an upper limit for the dimensional heat resistance is encountered at about 150° C. if high mechanical property values and good temperature-cycle resistance are also required. Therefore, reaction resin mixtures have been developed which are based upon polyepoxides and polyisocyanates, so-called EP/IC resins. During thermal hardening of EP/IC resins in the presence of suitable reaction accelerators, i.e., hardening catalysts, molded materials are formed which have heat-resistant oxazolidinone and isocyanurate structures, so-called OX/ICR molded materials. The dimensional heat resistance and the continuous heat stability of these reaction-resin molded materials can be increased by increasing the content of isocyanurate structures; at the same time, however, the brittleness of the molded materials increases and the temperature-cycle resistance decreases.

It is an object of the invention, therefore, to develop heat-hardenable reaction resin mixtures which are based upon polyfunctional epoxides and polyfunctional isocyanates, are stable in storage, consist of individual components which can readily be mixed, have a long use time during preparation as well as in processing, and permit the manufacture of molded materials which have the good mechanical properties and high temperature-cycle resistance of polyurethane structures and the good thermal properties of OX/ICR structures.

SUMMARY OF THE INVENTION

According to the invention, these and other objects are achieved by a reaction resin mixture which contains as the polyfunctional isocyanate an isocyanate prepolymerisate which is a reaction product of diphenylmethanediisocyanate and of a diol or which is a reaction product of a diol and of an isocyanate mixture of diphenylmethanediisocyanate and a polymethylenepolyphenylisocyanate having at least 2 isocyanate groups per molecule or monomer unit. The functional group equivalent ratio of isocyanate to diol is with in a range of 1:0.01 to 1:0.35 and preferably 1:0.05 to 1:0.2 The molar equivalent ratio of epoxy to isocyanate is within a range of 1:0.2 to 1:5. The reaction accelerator is a tertiary amine or an imidazol.

BRIEF DESCRIPTION OF THE DRAWING

FIG. 1 illustrates some properties of the resin mixtures of examples 1 and 2.

DETAILED DESCRIPTION OF THE INVENTION

The reaction resin mixtures according to the invention, which are cross-linked and hardened preferably at temperatures from room temperature to 200° C., furnish OX/ICR molded materials which contain oxazolidinone and isocyanurate structures and to a lesser extent, also urethane structures. These molded materials have excellent mechanical properties and a very high temperature-cycle resistance while at the same time, have high dimensional heat resistance.

The reaction resin mixtures, according to the invention, contain an isocyanate prepolymerisate (in the form of a reaction product of an isocyanate compound with a diol) and have a prolonged period of use. In addition, they have highly miscible individual components, which is an advantage for processability. It is furthermore also surprising that the resulting OX/ICR molded materials even have excellent flexibility when a very small content of isocyanate prepolymerisate is used in the resin mixtures.

In the preparation of the isocyanate prepolymerisates, it is essential that per isocyanate equivalent (of the isocyanate compound or the mixture of isocyanates used), 0.01 to 0.35 equivalents of the diol are used. For, with a higher diol content of the reaction resin mixtures, the dimensional heat resistance of the molded materials decreases distinctly, so that molded materials not having the desired properties are obtained. Furthermore, such reaction resin mixtures cannot be processed when fillers are added, because they exhibit a high viscosity.

It has already been attempted through reaction resin mixtures which consist of an epoxy resin, a polyol and an isocyanate to achieve development of the excellent mechanical properties of a polyurethane combined with the high dimensional heat resistance of an OX/ICR molded material (see in this connection DE-OS No. 3 001 637). Such ternary systems of polyepoxides, polyols and polyisocyanates, however, have disadvantages with respect to the processing since polyols and polyisocyanates facilly react exothermally at low temperatures to produce urethanes. This, however, means a rapid viscosity increase and poor processability. Such systems are, therefore, unusable for many applications, particularly for the impregnation of electrical windings. It is also known that polyol and polyisocyanates frequently exhibit poor miscibility. In addition, hydroxyl functions have a cocatalyzing effect on the trimerisation of isocyanates (to form isocyanurates) when they are in the presence of amines which are frequently used as hardening agents. Therefore, such materials promote crystalline deposits.

The hardenable polymer mixtures according to DE-OS No. 3 001 637 achieve an increase of the dimensional heat resistance of known polyurethane molded materials up to the level of anhydride-hardened epoxy resin molded materials, by use of 0.7 to 1.4 equivalents of polyol per 1 equivalent of isocyanate and 0.3 to 1 equivalents of epoxy per 1 equivalent of isocyanate. In contrast thereto, use of the reaction resin mixtures according to the invention which are free of polyol produces mechanically improved OX/ICR molded materials and provides dimensional heat stability which is far above that of known acid anhydride-hardened epoxy resin molded materials.

From U.S. Pat. No. 4,220,731, a method for the preparation of cross-linked polymers is known, in which liquid epoxy compounds which contain at least two epoxy groups in the molecule are reacted with polyisocyanates and optionally with polyhydroxyl compounds in the presence of hardening catalysts at temperatures between room temperature and 250° C. In this method, acid catalysts are used exclusively, however, because the use of a complex compound of $BF_3$ with an ether, a phosphonium compound or with water are prescribed as mandatory as a hardening catalyst, optionally together with an Sn, Zn or Fe compound soluble in the reaction mixture.

In the reaction resin mixtures according to the invention, 0.2 to 5 equivalents of isocyanate are used per 1 equivalent epoxy. This means that the equivalent ratio of epoxy to isocyanate (EP:IC) is 1:5 to 5:1.

In the reaction resin mixtures according to the invention, the polyisocyanates are contained in the form of isocyanate prepolymerisates. Such compounds are commercially obtainable, but they can also be made in accordance with known methods.

From U.S. Pat. No. 4,055,548, for instance, a liquid isocyanate prepolymerisation compound is known which consists of a reaction product of (a) an isocyanate mixture of 65 to 85% by weight diphenylmethane-diisocyanate and 15 to 35% by weight of polymethylenepolyphenyl-isocyanate with a functionality of greater than 2 which mixture is reacted with (b) 0.0185 to 0.15 equivalents of a polyoxyethylene glycol per equivalent of the isocyanate mixture, with an average molecular weight of 200 to 600. This known isocyanate prepolymerisate which is obtained exclusively by reaction of an isocyanate mixture is not used however, for EP/IC resins but it serves for the production of polyurethanes.

Isocyanate prepolymerisates are also known from British Pat. No. 1,450,660. These polyisocyanates are prepared by reacting a mixture of polyphnylpolyisocyanates which have a varying number of methylene units, which contains 55 to 85% by weight diphenylmethane-diisocyanate with 0.005 to 0.35 equivalents of an alkylene diol or polyoxyalkylene diol per equivalent isocyanate group in the mixture. Preferably, 0.05 to 0.15 equivalents of alkylene diol are used which correspond to a consumption of 5 to 15% of the isocyanate groups. Also, these polyisocyanates serve for the manufacture of polyurethanes.

From U.S. Pat. No. 3,394,164, liquid storage-stable isocyanate prepolymerisates are known which are prepared by reaction of diphenylmethane-diisocyanate with 2 to 10% by weight dipropylene glycol in the presence of small amounts of phcsphoric acid (0.001 to 0.1% by weight, referred to the isocyanate) at temperatures of 40° to 110° C. These prepolymerisates which have a functionality of 2 and have low viscosity, also serve for the production of polyurethanes.

In the manufacture of the isocyanate prepolymerisates, lowmolecular weight monomeric diols, such as ethylene glycol, propylene glycol and 1,6-hexane diol, as well as higher-molecular oligomeric diols such as polyoxyalkylene diols which are produced by polymerisation of an alkylene oxide in the presence of water can be used. Preferred compounds of this type are polyoxyethylene glycol and polyoxypropylene glycol.

The reaction resin mixtures according to the invention contain preferably isocyanate prepolymerisates in the form of reaction products of isocyanate mixtures of diphenylmethanediisocyanate and polymethylenepolyphenylisocyanates with alkylene diols or polyoxyalkylene glycols. The polyoxyalkylene glycols used have advantageously an average mol mass of 100 to 1,000 and preferably of 200 to 800. The content of polymethylenepolyphenyl isocyanates in the isocyanate mixture is preferably up to 35% by weight.

In the reaction resin mixtures according to the invention, the isocyanate prepolymerisates can be used alone or in a mixture with other polyisocyanates. Suitable as mixture components are relatively low-viscosity aliphatic, cycloaliphatic or aromatic isocynates. Preferably are used isomer mixtures of 4,4'- and 2,4'-diphenylmethanediisocyanate and mixtures of liquid polyisocyanates with higher-molecular polyisocyanates or carbodiimide polyisocyanates. Other usable polyisocyanates, are, for instance, hexane-1,6-diisocyanate, cyclohexane-1,3-diisocyanate and isomers, 4,4'-dicyclohxylmethane diisocyanate, 3-isocyanatomethyl-3,5,5-trimethylcyclohexylisocyanate, 1,3-dimethyl benzene-omega, omega'-diisocyanate and isomers, 1-methylbnzene-2,4-diisocyanate and isomers, naphthalene-1,4-diisocyanate, diphenylether-4,4'-diisocyanate and isomers, diphenylsulfone-4,4'-diisocyanate and isomers as well as tri- or higher-functional isocyanates such as 3,3',4,4'-diphenylmethanetetraisocyanate. Furthermore, isocyanates can be used which are masked in the usual manner with phenol or cresol. Dimers and trimers of the mentioned multivalent isocyanates can likewise be used. Such polyisocyanates have free endposition isocyanate groups and contain uretimine, uretidione and/or isocyanurate rings. Methods for preparing various kinds of such trimers and uretdiones are described, for instance, in U.S. Pat. Nos. 3,494,888; 3,108,100 and 2,977,370.

Relatively low-viscosity aliphatic cycloaliphatic or aromatic epoxides as well as their mixtures are especially well suited as polyepoxides. Preferred are bisphenol-A-diglycidyl ether, bisphenol-F-diglycidyl ether, 3,4-epoxycyclohexylmethy1-3',4'-epoxycyclohexane carboxylate, polyglycidyl ethers of phenol formaldehyde or cresol/formaldehyde novolak and diglycidyl esters of phthalic-, isophthalic- or terephthalic acid. Other usable polyepoxides are, for instance, hydrogenated bisphenol-A- or bisphenol-F-diglycidyl ethers, hydantoin epoxy resins, triglycidylisocyanurate, triglycidyl-p aminophenol, tetraglycidyldiaminodiphenylmethane, tetraglycidyldiaminophenyl ether and tetrakis(4-glycidoxyphenyl)-ethane as well as epoxides which are described in "Handbook of Epoxy Resins" by Henry Lee and Kris Neville, MacGraw-Hill Book Company, 1967 and in the monograph by Henry Lee "Epoxy Resins", American Chemical Society, 1970.

The reaction resin mixtures according to the invention may also contain components which generally do not participate in the chemical reactions which lead to the OX/ICR molded materials. As such fillers are suited mineral and fibrous fillers such as quartz powder, fused silica, aluminum oxide, glass powder, mica, kaolin, dolomite, graphite and carbon black, as well as carbon fibers, glass fibers, and textile fibers. Pigments, stabilizers and adhesion agents as well as other additives of the usual kind can likewise be added to the reaction resin mixtures.

For the EP/IC resin mixtures according to the invention, the reaction accelerators or (hardening) catalysts are important for the promotion of cross-linking and the consequent formation of OX and ICR rings. Tertiary amines and imidazoles can be used for this purpose. Suitable tertiary amines are also suitable, for instance, tetramethylethylenediamine, dimethyloctylamine, dimethylaminoethanol, dimethylbenzylamine, 2,4,6-tris(dimethylaminoethyl)-phenol, N,N'-tetramethyldiaminodiphenylmethane, N,N'-dimethylpiperazine, N-methylmorpholine, N-methylpiperidine, N-ethylpyrrolidine, 1,4-diazabicyclo(2,2,2)-octane and quinolines. Suitable imidazoles are, for instance, 1-methylimidazole, 2-methylimidazole, 1,2-dimethylimidazole, 1,2,4,5-tetramethylimidazole, 2-ethyl-4-methylimidazole, 1-cyanoethyl-2-phenylimidazole and 1-(4,6-diamino-s-triazinyl-2-ethyl)-2-phenylimidazole.

Suitable reaction accelerator for the EP/IC resin mixtures also are onium salts of tertiary amines and imidazols, i.e., onium salts with N as the central atom.

Examples of useful onium salts are: tetraethylammonium chloride, tetraethylammonium bromide, octyltrimethylammonium bromide, benzyltrimethylammonium chloride, N-ethylmorpholinium bromide, 2-ethyl-4-methylimidazolium bromide, N-ethylmorpholinium tetraphenylborate, 1,2-dimethylimidazolium tetraphenylborate and tetrabutylammonium tetraphenylborate.

In the thermal hardening of the EP/IC resins according to the invention, which preferably takes place at temperatures from room temperature to 200° C., the foregoing catalysts lead to high-quality OX/ICR molded materials of excellent thermal and mechanically properties. While they catalyze the hardening reaction at low temperatures and lead to a use time which is not sufficient in all cases and can make the processing of the reaction resin more difficult, these catalysts, because of the good miscibility of the starting components of the reaction resin mixtures, can be used in all those cases in which the processing takes place in accordance with the two-component principle and the mixture of the two components is carried out in a static mixing tube.

Preferably, latent hardening catalysts are therefore used in the EP/IC resin mixtures according to the invention, which ensure sufficient use time. As such catalysts, which are also called latent reaction accelerators, are suitable particularly addition complexes of boron trihalogenides with tertiary amines and imidazols, for instance, the addition complexes (described in U.S. Pat. No. 4,131,600), of boron trichloride and tertiary amines of the general formula $BCl_3 \cdot NR^1R^2R^3$, where $R^1$, $R^2$ and $R^3$ are the same or different aliphatic, aromatic, heterocyclic or arylaliphatic radicals, which may also be part, in pairs, of heterocyclic rings. Suitable are also the analogous complexes of boron trifluoride of the formula $BF_3 \cdot NR^1R^2R^3$, where $R^1$, $R^2$ and $R^3$ have the meaning given above. Specific examples for suitable tertiary amines of the $BF_3$ and $BCl_3$ complexes are octyldimethylamine and dimethylbenzylamine. Also morpholine compounds and imidazoles, particularly N-methylmorpholine, N-ethylmorpholine, 1,2-dimethylimidazole and 1-benzyl-2-phenylimidazole are suitable for the formation of $BCl_3$ or $BF_3$ complexes, respectively.

The hardening catalyst content in the EP/IC resins is advantageously 0.01 to 5% by weight and preferably 0.25 to 2.5% by weight, relative to the mass of the resin matrix. The hardening temperature and the hardening time are influenced by the kind and by the concentration of the hardening catalyst. The reaction resin mixtures according to the invention, which contain isocyanate prepolymerisates, are in the absence of catalysts, mixtures stable in storage which can be stored for weeks without appreciable build-up of the viscosity and without precipitation of crystalline substances. Also, if latent hardening accelerators are used, reaction resin systems are obtained which do not harden until certain processing conditions are met and which have viscosity stability. These resin mixtures can be processed by methods such as vacuum casting and the VPI technique, as well as in analogy with injection molding. Such processing methods are commonly used methods for epoxy resins in electrical engineering.

The OX/ICR molded materials produced by thermal hardening of EP/IC resins containing isocyanate prepolymerisates, are characterized by very good mechanical properties and high temperature-cycle resistance with simultaneously high dimensional heat resistance. They are therefore especially well suited for the impregnation and embedment of electrical windings for rotating machines and transformers. The reaction resin mixtures according to the invention are eminently suited for the fabrication of mechanically extremely strong insulating components, such as insulators, holding and support elements as well as bushings in switching and power transmission technology. A further preferred field of application is the embedment and encapsulation of electronic components.

The invention will be explained in greater detail with the aid of embodiment examples.

EXAMPLES 1 to 4

A bisphenol-F-bisglycidylether (BFBG, Ep value=0.62 mol/100 g, n at 50° C.=1100 mPasec) is mixed together with a commercially available isocyanateprepolymerisate on the basis of diphenylmethanediisocyanate and polypropylene glycol (isocyanate A: NCO value=0.59 mol/100 g, n at 25° C.=140 mPa sec), an isomer mixture, liquid at room temperature of diphenylmethanediisocyanate (MDI: NCO value=0.79 mol/100 g, n at 25° C.=15 mPa sec) and 65% quartz powder (16,900 M/cm$^2$) and is degassed for 1 hour at 80° C./1 mbar. Subsequently the mixture is cooled down to 50° C., the reaction accelerator (RKB), for instance, $BCl_3 \cdot DMBA$ ($BCl_3$ adduct of dimethylbenzylamide) or CEPI (1-cyanoethyl-2-phenylimidazole) is added and degassed at 50° C./1 mbar for another hour. The composition of the reaction resin mixtures is given in Table 1. The reaction resin mixtures are cast in a vacuum into molds preheated to 100° C. and are hardened for 4 hours at 140° C. and 16 hours at 200° C. to form molded materials. On the molded materials prepared in this manner, the impact strength (SZ) was determined in accordance with DIN No. 53 453, the bending strength (BF) according to DIN 53 452 and the dimensional heat resistance after Martens ($T_M$) in accordance with DIN 53 458. The values obtained are summarized in Table 2.

TABLE 1

Composition of the Reaction Resin Mixtures (MT = Mass Parts)

| Example | BFBG MT | Isocyanate A MT | MDI MT | RKB MT | Filler MT |
|---|---|---|---|---|---|
| 1 | 100 | 67 | 28 | 2.9 BCl$_3$.DMBA | 360 |
| 2 | 100 | 67 | 28 | 2.0 CEPI | 360 |
| 3 | 100 | 161 | 87 | 5.2 BCl$_3$.DMBA | 651 |
| 4 | 100 | 161 | 87 | 3.5 CEPI | 651 |

TABLE 2

Thermal-Mechanical Properties of the OX/ICR Molded Materials

| Example | $T_M$ °C. | SZ $\frac{Nmm}{mm^2}$ | BF $\frac{N}{mm^2}$ |
|---|---|---|---|
| 1 | 176 | 13 ± 2 | 137 ± 13 |
| 2 | 150 | 18 ± 2 | 155 ± 8 |
| 3 | 206 | 11 ± 2 | 121 ± 8 |
| 4 | 219 | 10 ± 2 | 128 ± 16 |

EXAMPLES 5 AND 6

A bisphenol-F-bisglycidylether (BFBG, Ep value=0.62 mol/100 g, n at 50° C.=1100 mPa sec) is processed together with a commercially available isocyanate prepolymerisate on the basis of diphenylmethane-diisocyanate and polypropyleneglycol(isocyanate B: NCO value=0.54 mol/100 g, n at 25° C. 650 mPa sec), an isomer mixture, liquid at room temperature, of diphenylmethanediisocyanate (MDI) and 65% quartz powder in analogy of Examples 1 to 4 and is processed in the presence of a reaction accelerator (RKB) to form molded materials. The composition of the reaction resin mixtures can be seen from Table 3. As described in Examples 1.to 4, the thermal-mechanical properties were measured on the hardened molded materials; they are summarized in Table 3 below (cf. page 18).

TABLE 3

Composition of the Reaction Resin Mixtures (MT = Mass Parts)

| Example | BFBG MT | Isocyanate B MT | MDI MT | RKB MT | Filler MT |
|---|---|---|---|---|---|
| 5 | 100 | 122 | 122 | 5.2 BCl$_3$.DMBA | 675 |
| 6 | 100 | 122 | 122 | 3.4 CEPI | 675 |

EXAMPLES 7 AND 8

A bisphenol-F-bisglycidylether (BFBG, Ep value=0.62 mol/100 g, n at 50° C.=1100 mPa sec) is processed together with a commercially available isocyanate prepolymerisate on the basis of polymethylenepolyphenylisocyanate and polyethyleneglycol (isocyanate C; NCO=0.63 mol/100 g, n at 25° C.=260 mPa sec), an isomer mixture, liquid at room temperature, of diphenylmethanediisocyanate (MDI) and 65% quartz powder in analogy to the Examples 1 to 4 and is processed in the presence of a reaction accelerator (RKB) to form molded materials. The composition of the reaction resin mixtures is given in Table 5. As described in Examples 1 to 4, the thermal-mechanical properties were measured on the hardened molded materials; they are summarized in Table 6.

TABLE 5

Composition of the Reaction Resin Mixtures (MT = Mass Parts)

| Example | BFBG MT | Isocyanate C MT | MDI MT | RKB MT | Filler MT |
|---|---|---|---|---|---|
| 7 | 100 | 52 | 38 | 2.9 BCl$_3$.DMBA | 352 |
| 8 | 100 | 52 | 38 | 1.9 CEPI | 352 |

TABLE 6

Thermal-Mechanical Properties of the OX/ICR Molded Material

| Example | $T_M$ °C. | SZ $\frac{Nmm}{mm^2}$ | BF $\frac{N}{mm^2}$ |
|---|---|---|---|
| 7 | 185 | 12 ± 2 | 132 ± 8 |
| 8 | 160 | 14 ± 3 | 140 ± 10 |

EXAMPLE 9

A bisphnol-F-bisglycidylether (BFBG, Ep value=0.62 mol/100 g, n at 50° C.=1100 mPa sec) is processed together with a commercially available isocyanate prepolymerisate on the basis of diphenylmethanediisocyanate and polypropyleneglycol (isocyanate A; NCO value=0.59 mol/100 g, n at 25° C.=140 mPa sec) and 65% dolomite (grain size: 98%, <63 um) in analogy to Examples 1 to 4 and processed in the presence of a reaction accelerator (RKB) to form molded materials. The composition of the reaction resin mixture can be seen from Table 7. As described in Examples 1 to 4, the thermal-mechanical properties were measured on the hardened molded materials; they are summarized in Table 8.

TABLE 7

Composition of the Reaction Resin Mixture (MT = Mass Parts)

| Example | BFBG MT | Isocyanate MT | RKB MT | Filler MT |
|---|---|---|---|---|
| 9 | 100 | 280 | 5.7 BCl$_3$.DMBA | 705 |

TABLE 8

Thermal-Mechanical Properties of the OX/ICR Molded Material

| Example | $T_M$ °C. | SZ $\frac{Nmm}{mm^2}$ | BF $\frac{N}{mm^2}$ |
|---|---|---|---|
| 9 | 204 | 8 ± 2 | 90 ± 13 |

EXAMPLE 10

A bisphenol-F-bisglycidylether (BFBG, Ep value=0.62 mol/100 g, n at 50° C.=1100 mPa sec) is mixed together with a commercial isocyanate-prepolymerisate on the basis of diphenylmethanediisocyanate and polypropyleneglycol isocyanate A; NCO value=0.59 mol/100 g, n at 25° C.=140 mPa sec), an isomer mixture, liquid at room temperature, of diphenylmethanediisocyanate (MDI) and 65% quartz powder and degassed during 1 hour at 80° C./1 mbar. Subsequently the mixture is cooled to 50° C. and the reaction accelerator is added. Then, the viscosity build-up after a short homogenizing step is determined in a Haake-Rotovisko RV 3, measuring system SV II. The mixture composition corresponds to that from Examples 1 and 2. The viscosity build-up is compared in FIG. 1 to that of a resin mixture free of accelerator according to Example 1.

EXAMPLE 11

According to Example 1, a reaction resin mixture containing accelerator was prepared. The resin mixture, at a temperature of 50° C., is subsequently poured into the supply tank of an injection molding machine. By means of a suitable closing tool, standard rods are injection-molded with the following processing parameters: Mold temperature: 120° C.; injection pressure: 3 bar; closed-mold time: 10 minutes.

The standard rods, removed from the mold, are subsequently post-hardened for 16 hours at 200° C. The molded material properties are summarized in Table 9.

TABLE 9

Thermal-Mechanical Properties of the OX/ICR Molded Material

| Example | $T_M$ °C. | SZ $\frac{Nmm}{mm^2}$ | BF $\frac{N}{mm^2}$ |
|---|---|---|---|
| 11 | 167 | 123 ± 8 | 11 ± 2 |

EXAMPLE 12

Sample high-voltage windings for dry-type transformers were prepared from polyimide foil (25 um thick, 56 mm wide) as layer insulation and aluminum ribbons (0.1 mm thick, 50 mm wide), and sample coils consisting of 4 windings were built-up in a mold. The spaces between the individual coils as well as between the coils and the wall of the mold, which were to be cast full with the reaction resin mixtures according to the invention, were 6 to 8 mm, and at the pouring opening, about 15 mm. The sample coils were dried at 80° C./1 mbar and cast full in a vacuum with the resin mixture described in Example 1; after the processing described likewise in Example 1, the casting resin was gelled for about 90 minutes at 130° to 140° C. at overpressure by means of heating the winding. The sample coils were then removed from the mold and immediately annealed for 6 hours at 150° C. and at 180° C. for another 15 hours. Sample coils prepared in this manner withstand temperature cycles from +180° C. to −70° C. without crack formation.

TABLE 4

Thermal-Mechanical Properties of the OX/ICR Molding Material

| Example | $T_M$ °C. | SZ $\frac{Nmm}{mm^2}$ | BF $\frac{N}{mm^2}$ |
|---|---|---|---|
| 5 | 220 | 10 ± 2 | 119 ± 10 |
| 6 | 215 | 11 ± 2 | 123 ± 8 |

What is claimed is:

1. A heat-hardenable reaction resin mixture comprising:
   (a) a polyfunctional epoxide;
   (b) a polyfunctional isocyanate; and
   (c) a reaction accelerator selected from a tertiary amine or an imidazole, wherein;
   the polyfunctional isocyanate comprises an isocyanate prepolymerisate in the form of a reaction product of diphenylmethanediisocyanate and a diol or of a reaction product of a diol and an isocyanate mixture of diphenylmethanediisocyanate and a polymethylene polyphenylisocyanate having at least 2 isocyanate groups per molecule of monomer unit; the equivalent ratio of isocyanate to diol is from about 1:0.01 to about 1:0.35; and the equivalent ratio of epoxy to isocyanate is from about 1:0.2 to 1:5.

2. A reaction resin mixture according to claim 1 wherein the isocyanate prepolymerisate is a reaction product of an alkylene diol and an isocyanate mixture of diphenylmethane-diisocyanate and a polymethylene polyphenylisocyanate.

3. A reaction resin mixture according to claim 1 wherein the isocyanate prepolymerisate is a reaction product of a polyoxyalkylene glycol and a isocyanate mixture of diphenylmethanediisocyanate and a polymethylene polyphenylisocyanate.

4. A reaction resin mixture according to claim 3 wherein the polyoxyalkylene glycol has an average mol mass of 100 to 1000.

5. A reaction resin mixture according to claim 4 wherein the average mole mass is 200 to 800.

6. A reaction resin mixture according to claim 1 wherein the isocyanate mixture contains up to 35% by weight of a polymethylenepolyphenylisocyanate.

7. A reaction resin mixture according to claim 1 wherein the reaction accelerator is a latent reaction accelerator.

8. A reaction resin mixture according to claim 1 wherein the reaction accelerator content is 0.01 to 5% percent by weight relative to the weight of the reaction resin mixture.

9. A reaction resin mixture according to claim 8 wherein the reaction accelerator content is 0.25 to 2.5% by weight.

10. A reaction resin mixture according to claim 1 wherein the mixture contains quartz powder, fused silica, aluminum oxide or dolomite as a filler.

11. A reaction resin mixture according to claim 1 wherein the equivalent ratio of isocyanate to diol is from about 1:0.05 to about 1:0.2.

12. A thermal molded material suitable for embedding electric components, which comprises: the thermal reaction product produced from the reaction resin mixture of claim 1 by heating said mixture at a temperature from about room temperature to about 200° C.

13. A method of manufacturing a reaction resin molded material for an electrical component, which comprises the steps of: embedding the component with a reaction resin mixture according to claim 1, and hardening the mixture embedding the component by heating it at a temperature from room temperature to about 200° C.

14. A method of manufacturing a reaction resin molded material for an electrical winding, which comprises the steps of: impregnating the winding with a reaction resin mixture according to claim 1, and hardening the mixture impregnating the winding by heating it at a temperature from room temprature to about 200° C.

15. A method of manufacturing a reaction resin molded material insulating component, which comprises the steps of: injecting a reaction resin mixture according to claim 1 into a mold having the shape of the component and hardening the mixture contained in the mold by heating it to a temperature of from room temperature to about 200° C.

* * * * *